United States Patent [19]
Yano et al.

[11] 4,069,351
[45] Jan. 17, 1978

[54] EXTRACTING FOODS WITH A DIMETHYL ETHER-WATER MIXTURE

[75] Inventors: Nobumitsu Yano; Itaru Fukinbara, both of Tokyo; Mitsuo Takano, Sakai, all of Japan

[73] Assignee: Asahi Kasei Kogyo Kabushiki Kaisha, Osaka, Japan

[21] Appl. No.: 655,573

[22] Filed: Feb. 5, 1976

Related U.S. Application Data

[63] Continuation-in-part of Ser. No. 491,228, July 24, 1974, abandoned.

[51] Int. Cl.$^2$ .................. A23L 1/22; A23L 1/221; A23L 1/222
[52] U.S. Cl. .................. 426/650; 426/429; 426/430; 426/385; 426/651; 426/386; 426/387; 260/236.6; 252/522
[58] Field of Search .................. 252/522; 260/236.5, 260/236.6; 426/429, 430, 650, 651, 385, 386, 387

[56] References Cited

U.S. PATENT DOCUMENTS

| | | | |
|---|---|---|---|
| 2,079,415 | 5/1937 | Levinson | 426/429 X |
| 2,106,200 | 1/1938 | Young et al. | 260/236.6 |
| 2,286,334 | 6/1942 | Brandt | 426/430 |
| 2,903,359 | 9/1959 | Bonotto | 426/430 X |
| 3,221,181 | 12/1965 | Hoelle et al. | 426/429 |

OTHER PUBLICATIONS

Moneruff, "The Chemistry of Perfumery Materials", 1949, United Trade Press Ltd., London, p. 141.
Hawley, "The Condensed Chemical Dictionary", 1971, Van Nostrand-Reinhold Co., New York, p. 312.

*Primary Examiner*—Joseph M. Golian
*Attorney, Agent, or Firm*—Cooper, Dunham, Clark, Griffin & Moran

[57] ABSTRACT

Hydrophilic and lipophilic flavor and odor producing components of natural products are obtained by extraction with defined dimethyl either-water mixtures.

14 Claims, 4 Drawing Figures

MUTUAL SOLUBILITY CURVE OF DIMETHYL ETHER-WATER

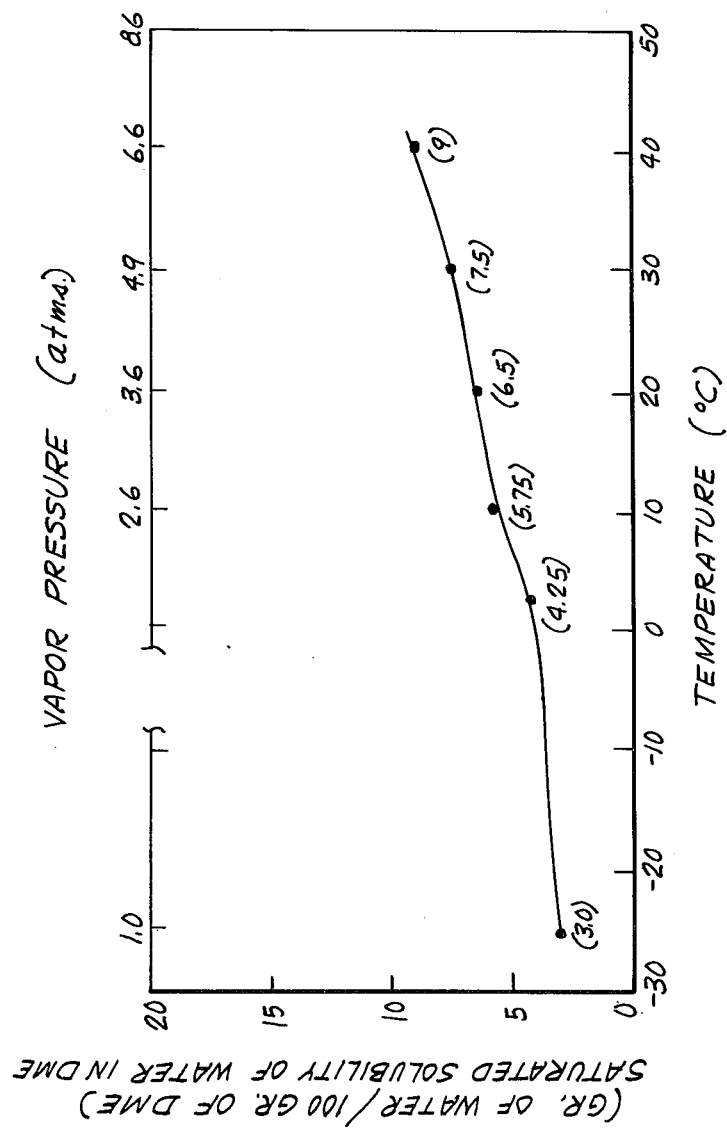

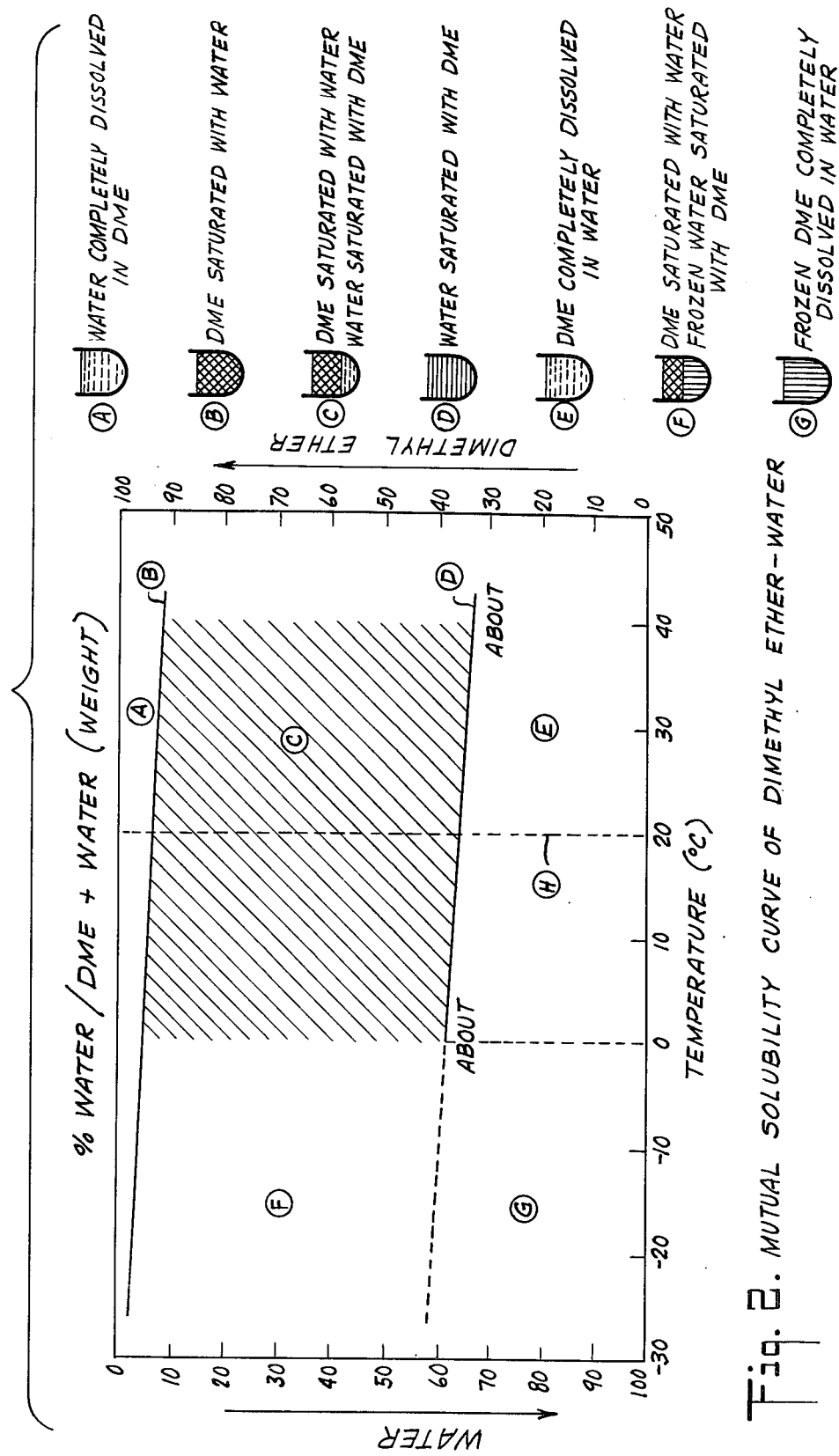
Fig. 2. MUTUAL SOLUBILITY CURVE OF DIMETHYL ETHER-WATER

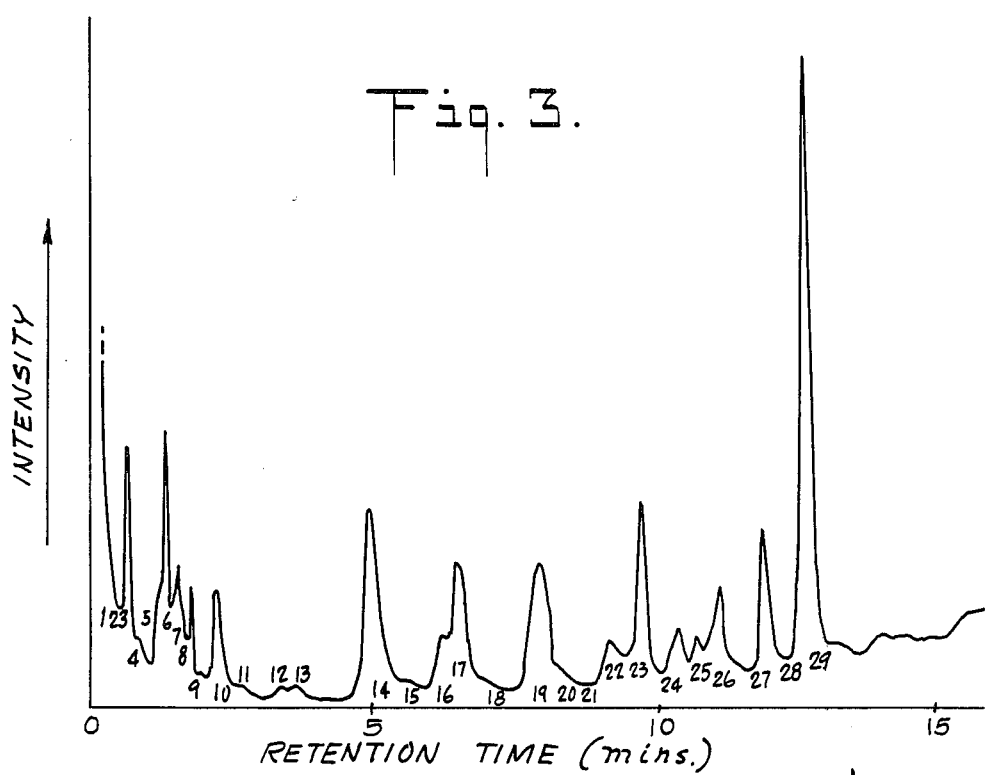
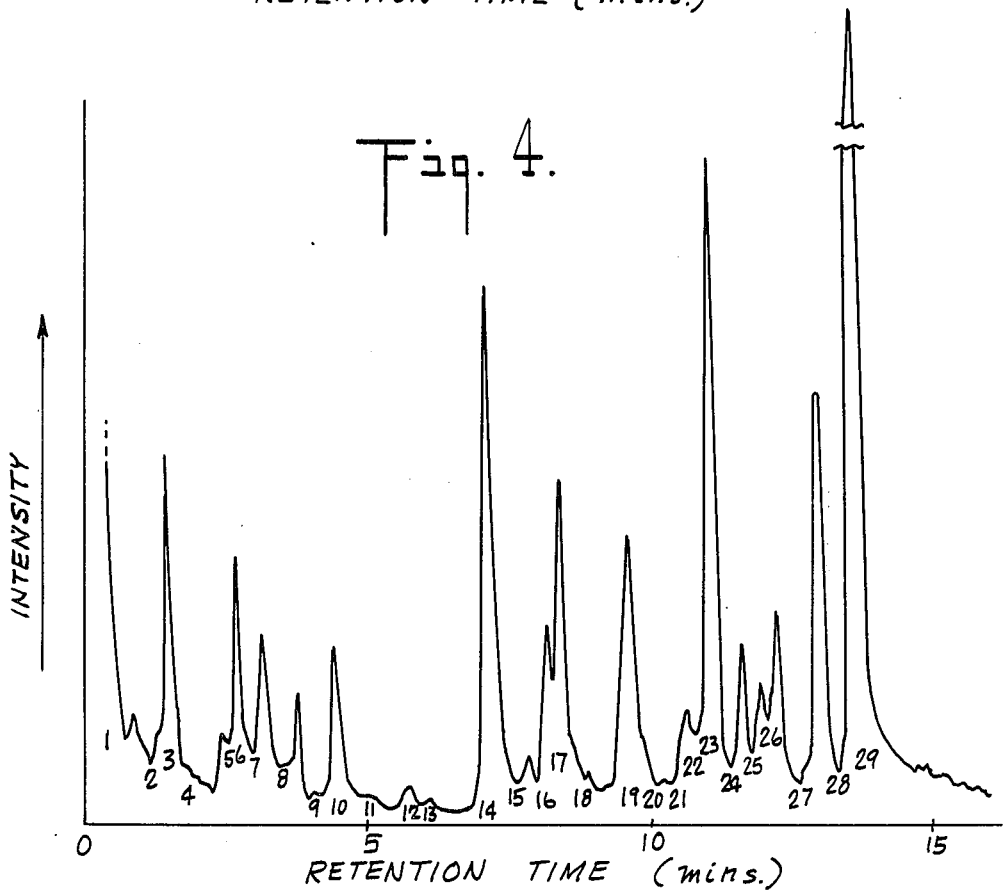

EXTRACTING FOODS WITH A DIMETHYL ETHER-WATER MIXTURE

RELATED APPLICATION

This application is a continuation-in-part of our co-pending application Ser. No. 491,228 filed July 24, 1974 and now abandoned.

BACKGROUND OF THE INVENTION

It is well recognized that the pleasurable sensation associated with the odor of flowers and the taste and odor of foods is associated with a complex mixture of hydrophilic and lipophilic odoriferous and flavor producing compounds which affect the olfactory and taste nerves. The mixture comprises only an extremely small proportion by weight of the total.

The mixture normally contains a variety of organic compounds such as acids, aldehydes and ketones, many of which are extremely labile and subject to decomposition when exposed to harsh chemical or physical treatment. Additionally, many of them are extremely volatile so that they readily escape to the atmosphere when exposed to high temperatures.

In a sense, the remaining portion of the food or flower may be considered to be merely a carrier for the odoriferous and flavor producing components. It would be useful to be able to separate these components from their natural carrier so that they could be utilized for other purposes. For example, it would be useful to isolate them from beef in order to enhance the flavor of less expensive proteins such as soy meal, thus making this valuable protein source more palatable for mammals. Similarly, it would be useful to extract the flavor and aroma constituents from spices, rather than to utilize them in their presently available form which in many cases is the dried and powdered plant, leaf, fruit or flower. Additionally, new perfumes and other cosmetics can be prepared by blending the aroma constituents obtained from more than one flower.

An important utility for the flavor and aroma constituents of coffee beans or tea leaves is to enhance the attractiveness of commercially available coffee and tea. The commercial preparation of these products is often associated with the loss or destruction of the desirable aroma and flavor producing ingredients of the natural product.

For these and other reasons, considerable effort has been expended in attempts to isolate the complex mixture which may be regarded as the essence of various foods and flowers. The methods which have been devised have included, for example, squeezing, decoction, steam distillation, extraction with liquid organic solvents or with semi-solids such as tallow or lard. None of these procedures have been completely satisfactory for a variety of reasons. Steam distillation, for example, causes decomposition of the more labile constituents of the mixture due to exposure to air at high temperatures. The use of tallow or lard is too complicated, too expensive and, as a practical matter, is essentially limited to extraction of rose petals. Liquid organic solvents tend to be too oleophilic so that they extract principally the oil soluble materials, or too hydrophilic so that they extract principally the water soluble ingredients. This is unsatisfactory because the total sensation associated with a particular food or flower is a result of the individual contributions of both hydrophilic and lipophilic constituents.

As used herein, the term food or food substance refers to any substance which is normally ingested orally, whether in solid or liquid form, whether as a source of nutrition, or merely satisfaction and pleasure. It includes, for example, solid foods such as mushrooms; fish products such as shrimps, crabs and bonito; meat products such as beef, lamb, pork, and chicken; spices such as cinnamon, clove, ginger and pepper; and drinks such as coffee, tea or cocoa. In the last mentioned cases, the term includes the concentrates from which the product actually ingested is produced, for example, instant coffee or tea.

THE DRAWINGS

FIG. 1 is the solubility curve of water saturated with dimethyl ether at a vapor pressure of from about 1 to 8 atmospheres in the temperature range from about $-30°$ C to about 40° C.

FIG. 2 is a portion of the phase diagram for the system water-dimethyl ether showing the phase conditions in various sections of the system.

FIG. 3 is a gas liquid chromatographic chart of extraction by dimethyl ether alone.

FIG. 4 is a gas liquid chromatographic chart of extraction by a water-dimethyl ether mixture.

THE INVENTION

It has now been discovered that the odoriferous and flavor producing ingredients of flowers and food substances, both oil soluble and water soluble ingredients, can be extracted utilizing liquid dimethyl ether. The extract containing the essence mixture can be separated by evaporation of the extractant.

More specifically, a method has been discovered for obtaining novel mixtures containing the hydrophilic and lipophilic flavor and odor producing components of natural product substrates such as foods and flowers. In accordance with the process, the substrate is extracted with defined liquid mixtures of water and dimethyl ether at a temperature of about $-25°$ C to 40° C and the extraction residue separated. At least a portion of the dimethyl ether is then removed, most conveniently by evaporation. The balance of the dimethyl ether and the water can be similarly removed. The weight ratio of dimethyl ether to substrate is typically from 1:1 to 5:1. The weight ratio of water to dimethyl ether in the extraction mixture is such that in the phase diagram of the system water-dimethyl ether the amounts of each component are described by the solubility curve defining dimethyl ether saturated with water at from about $-25°$ C to 0° C, and by the curves defining dimethyl ether saturated with water and water saturated with dimethyl ether at a temperature of from about 0° C to 40° C.

Dimethyl ether is gaseous under standard atmospheric conditions. It can be readily liquified by cooling to below $-25°$ C at atmospheric pressure or by compression to above about 5 atmospheres at room temperature. Liquified dimethyl ether readily dissolves most oils and also dissolves about 6.3% by weight of water at 20° C. It has a specific gravity of 0.661 and a latent heat of vaporization of 96.6 cal/g. Its physical properties are especially important to this invention. Since it dissolves both water and oil, it dissolves substantially all of the oil and many of the water soluble ingredients in the complex chemical mixture so that the extract is closer to the natural mixture. Since the amount of water it dissolves is not too great, it freezes during evaporation of the dimethyl ether at room temperature or well below room temperature. As a result, the volatile components in the complex mixture do not evaporate during vaporization of the solvent phase.

Dimethyl ether appears to be unique in its ability, when used in selected mixtures with water, to extract mixtures of both oil and water soluble, flavor and odor producing constituents of natural products. This may be associated with the fact that it is a very small molecule with a molecular diameter of about 5 angstroms. Because of its small size, it appears to be capable of easily permeating the void spaces in the natural product substrates. Because it can be used in association with defined quantities of water, it is possible to simultaneously extract both water and oil soluble essences. This combination of properties is not shared with other organic solvents such as diethyl ether, hexane, petroleum ether, and the like which have heretofore been suggested as extraction solvents for natural products. In fact, so far as is known, no procedure has yet been devised for the simultaneous extraction made possible by this invention so as to produce the unique products thereof.

The method of selecting an appropriate extraction mixture containing water-dimethyl ether can be readily understood from a consideration of the solubility curve of FIG. 1, the portion of the phase diagram in FIG. 2, and the illustrations of phase changes which also form a part of FIG. 2. The extraction mixtures are selected so that they are liquid, that is free of any solid phase, and so that the relative amounts of water and dimethyl ether are defined by line B of FIG. 2 from about −25° C to 0° C, and by area C. Area C, in turn, is defined by line B from about 0° C to 40° C and line D from about 0° C to 40° C. Line B is the solubility curve for dimethyl ether saturated with water. Line D is the solubility curve for water saturated with dimethyl ether. In area C, there are two phases dimethyl ether saturated with water, and water saturated with dimethyl ether. Below 0° C in area F and in area G, there is a solid phase resulting from freezing of the phase which is water saturated with dimethyl ether.

It will be appreciated, of course, that some variation from the exact compositions defined above can be tolerated, and that while the extraction mixture is defined as a liquid free of solid phases, small amounts of solid phase can be tolerated. It is preferred, however, that the extraction mixture be totally free of solid frozen phase during extraction.

Dimethyl ether is gaseous at standard conditions. It can be liquified by reducing the temperature or increasing the pressure in accordance with techniques known in the art. At one atmosphere, liquefaction takes place at about −25° C. As the temperature increases, the amounts of pressure required also increases. Above 25° C, the required pressure may be 5 atmospheres or more. The presently preferred range of temperature and pressure while operating within the scope of the above definition is from −25° C to 25° C at 1 to 4 atmospheres.

Examples of the raw materials which are used for this invention include: various spices such as pepper, turmeric, laurel, anise, thyme, cinnamon, clove, ginger, nutmeg, vanilla, Japanese pepper; raw materials for drinks such as coffee, black tea, green tea, cocoa, hops; various raw materials for condiments such as dried bonito, dried shiitake (mushroom: Cortinellus shiitake), sea tangle (seaweed); various fruits such as apple, apricot, banana, orange, lemon, lime, pineapple, citron; various vegetables such as onion, garlic, celery wasabi (Japanese horseradish), matsutake mushroom (Armillaria matsutake); various animal food products such as beef, pork, chicken, roast beef, roast pork, roast chicken, lobster, shrimp, prawn, crab, york; various raw materials for flower essence oils such as rose mimosa, jasmine, Daphne, chrysanthemum.

As is well known, many natural products contain certain amounts of water. Some flowers and vegetables, in fact, contain 50% or more by weight of water. This bound water is included in determining the weight percent of water in the dimethyl ether-water extraction mixture. There are, therefore, several procedures for obtaining the extraction mixture. With substrates that contain relatively large amounts of water, say 50% or more, it is usually possible to form the extraction mixture by simply adding dimethyl ether. If the substrate contains small amounts of water, for example less than 50%, it is normally desirable to add water. The water may be added before the dimethyl ether is added, or together with the dimethyl ether. In any event, the weight ratio of dimethyl ether to substrate and the weight percent of water in the extraction mixture should be as described above.

The process of the invention is especially valuable in the production of instant coffee or instant tea. For this particular utility, the original substrate is first extracted with a dimethyl ether-water extraction mixture. The residue is then extracted in the usual way with water (usually hot), and the instant coffee or tea product is produced by evaporation procedures such as spray drying or other suitable technique. This material is deficient in odor and flavor, since these have been extracted with the dimethyl ether. The flavor and odor of the instant coffee can be reimparted by the addition of the mixture obtained by evaporation of the extraction liquid. A special advantage is that the degree of odor and flavor can be controlled by the amount of mixture added. Another is that the odor and flavor can be blended by the addition of a variety of odor and flavor constituents from a number of different coffee or tea species to one basic instant product obtained by water extraction.

Still another advantage of the invention is that the aroma and flavor components can be readily deposited on a preservative or carrier directly from the dimethyl ether-water solution. For example, a solid adsorbent or a liquid solvent can be added to the extraction solution prior to the evaporation of the extraction liquid. Upon evaporation of the ether, the solute will be adsorbed on, or will dissolve in, the additive. Typically useful carrier include talc, kaolin, celite, white carbon, lactose, sucrose, starch, microcrystalline cellulose (e.g. Avicel), and powdered cereals. The most useful liquid carrier is ethanol, and this is used principally with flower extracts in the preparation of perfume. The constituents may be preserved on the adsorbent or in the solvent until ready for use, or they may be used in the absorbed or dissolved form.

It is also advantageous to add a condiment or flavor enhancer to the extraction solution prior to evaporation. For example, the addition of monosodium glutamate to the extraction solvent of dried bonito or mushroom will remarkably improve the flavor of the resulting extract.

The technique described for the production of instant coffee can be combined with the use of a flavor enhancer to produce a dried bonito powder of remarkably delightful flavor. The dried bonito is first extracted with the liquid extraction mixture. It is then extracted with water and spray dried. Monosodium glutamate is added to the extraction solution and the solvents evaporated. The extracts are then mixed.

Usually extraction efficiency is maximized if the combined volume of substrate and extraction solvent is about two-thirds of the total volume of the extraction vessel.

The extraction period is generally sufficient if it is from about 5 to 60, preferably 5 to 20 minutes, although this is not critical and obviously will vary with factors such as temperature, volume, degree of agitation and substrate being extracted.

The extraction may be carried out batchwise in a pressure vessel or autoclave. Alternately, it may be carried out in a closed pressurized system. This latter procedure is especially preferred for industrial operations. It is also especially adapted for continuous flow extraction where the solvent passes through and over the substrate in a container, usually a tubular container. While appreciable variation is permissible, the flow velocity in this procedure will normally be from about 1 to 5 liters per hour per 1000 g. of substrate.

The following non-limiting examples are given by way of illustration only.

EXAMPLE 1

Ten gram samples of jasmine containing 8 g. of water were immersed in 100 cc each of liquid dimethyl ether, liquid butane and petroleum ether. The solutions were placed in 150 cc autoclave and subjected to shake extraction (60 cycles/min.) for ten minutes. At the end of the extraction, the solvents were evaporated to obtain the extract. The extracts were weighed and taken as weights of total extracts. The portions of the total extracts which dissolved in diethyl ether were weighed and taken as weights of extract oil. The samples were also extracted by steam distillation. Each sample was subjected to steam distillation for 30 minutes. The distilled oil phase was separated from the water phase by means of a separation funnel. The oil phase thus separated was weighed and taken as weight of total extract. The portion of the total extract which dissolved in diethyl ether was weighed and taken as weight of extract oil. The results are shown in Table 1.

TABLE 1

| Number of Extractions | Extraction Solvent | | | | | | | |
|---|---|---|---|---|---|---|---|---|
| | Weight of total extract (g) | | | | Weight of extract oil (g) | | | |
| | Liquid dimethyl ether | Liquid butane | Petroleum ether | Steam distillation | Liquid dimethyl ether | Liquid butane | Petroleum ether | Steam distillation |
| First | 1.002 | 0.401 | 0.021 | — | 0.039 | 0.016 | 0.019 | — |
| Second | 0.512 | 0.210 | 0.010 | — | 0.004 | 0.010 | 0.009 | — |
| Total | 1.514 | 0.611 | 0.031 | 0.011 | 0.043 | 0.026 | 0.028 | 0.010 |

The total extracts obtained by the four methods of extraction were subjected to a sensory test by a panel of 12 members according to the standard ranking test. The results of the test led to the conclusion that extracts obtained by use of liquid dimethyl ether excel the others at a 1% significance level in attractiveness of odor.

EXAMPLE 2

Roasted coffee beans (Peru) containing 2% of water were ground to a particle size of 20 to 80 mesh.
A. Ten (10) g. of the ground coffee were combined with 40 g. of water (5° C).
B. Ten (10) g. of ground coffee were combined with 40 g. of liquid dimethyl ether.
C. Ten (10) g. of ground coffee were combined with 33 g. of liquid dimethyl ether and 7 g. of water.

Each mixture was placed in a cylinder having a volume of 100 ml, shaken at normal room temperature for 20 minutes to effect extraction, and thereafter filtered to obtain an extracted solution. The extracted solutions from (B) and (C) were held at −5° C to evaporate the dimethyl ether. Each extract was placed in a one liter Erlenmeyer flask, sealed with an aluminum foil, left to stand at rest for five minutes in a room and then used as a sample in sensory test by a panel of 20 members. The samples were tried by the ranking method for intensity and quality of aroma. The following results were obtained:

| Test for intensity of aroma | | | | | Test for choice of aroma | | | | |
|---|---|---|---|---|---|---|---|---|---|
| sample | point 1 | 2 | 3 | Total | sample | point 1 | 2 | 3 | Total |
| (A) | 0 | 4 | 16 | 56 | (A) | 1 | 5 | 14 | 53 |
| (B) | 6 | 11 | 3 | 37 | (B) | 7 | 10 | 3 | 36 |
| (C) | 14 | 5 | 1 | 27 | (C) | 12 | 5 | 3 | 31 |

In the above tables, for example, total points 56 means that no person gave one point; four persons gave two points; and sixteen persons gave three points and are calculated by the equation:

$$56 = 1 \times 0 + 2 \times 4 + 3 \times 16$$

The level of significance is 5% where the total of points is less than 31 and greater than 49, and 1% where the total of points is less than 29 and greater than 51.

In terms of the intensity of aroma, the sample (A) ranked last with 1% of level of significance and the sample (C) ranked first with 2% of level of significance. While the sample (C) and the Sample (B) showed a small difference, the sample (A) showed a notably low intensity of aroma. In terms of the choice of aroma, the results were essentially the same, although with narrower differences. The sample (A) found the least acceptance with 1% of level of significance and the sample (C) found the greatest acceptance with 5% of level of significance.

EXAMPLE 3

Roasted coffee beans (Brazil) were ground to a particle size of 20 to 80 mesh. To separate 10 g. samples of the ground coffee containing 0.2 g. of water were added, (A) 40 g. of liquid dimethyl ether and (B) 30 g. of liquid dimethyl ether and 10 g. of water (5° C). Each mixture was placed in a cylinder having a volume of 100 ml, shaken for 15 minutes to effect extraction, and thereafter filtered to produce an extracted solution. The two samples were held at −5° C to vaporize the dimethyl ether and then analyzed for total aldehyde and volatile organic acid content with the following results:

Total aldehyde content A:B = 1.3
Total volatile organic acid content A:B = 8:1 These results indicate that the water-liquid dimethyl ether solvent was more efficient. Note: The total aldehyde content was determined by the bisulfite method and the total volatile acid content by the titration with normal alkali solution subsequent to steam distillation.

EXAMPLE 4

A 100 cc micro-cylinder was charged with 10 g. of pulverized lemon skin containing about 6 g. of water and 90 cc of liquefied dimethyl ether and hermetically sealed. The mixture in the micro-cylinder was shake extracted (60 cycles/min.) at 18° C under 4 atmospheres for 15 minutes. The micro-cylinder was turned upside down and the dimethyl ether containing the extract was drawn out. When the solution was heated to 18° C under atmospheric pressure to vaporize the dimethyl ether, there was obtained 1.0 g. of extract in the form of an oleo-resin. After three extractions, there was obtained 2.5 g. of extract. When this extract was extracted with 20 cc of 95% ethanol and 16 cc of water to remove terpene, there was obtained 38 mg. of terpine-free lemon essence. Orange and citron essence are obtained by the same procedure.

A dimethyl ether solution, 90 cc in volume, containing the extract obtained by treating 10 g. of powdered lemon skin in accordance with the above procedure was sprayed onto 10 g. of sucrose and left standing at 18° C under a reduced pressure to permit vaporization of the dimethyl ether. Consequently, there were obtained 12 g. of lemon sugar.

EXAMPLE 5

An agitator type autoclave having a volume of 2 liters was charged with 300 g. of Ceylon black tea containing 6 g. of water, 200 g. of water (5° C) and 600 g. of liquid dimethyl ether. The mixture was held at a pressure of 4.5 atmospheres for 20 minutes to effect extraction, and thereafter filtered to separate the extracted solution and the residue. A hot water extract was obtained by passing separate 500 g. portions of hot water three times through the residue, and it was then vacuum concentrated to produce 150 g. of concentrate. This concentrate was blended with the formerly collected liquid dimethyl ether-water extracted solution. The dimethyl ether content of the resultant mixture was evaporated at −5° C. The remaining mixture in its frozen state was transferred to a freeze drying apparatus and the water removed. Consequently, there were obtained 74.5 g. of instant black tea powder. A solution of 1 g. of this powder in 150 ml of hot water gave a black tea which was tasty and had the natural odor and flavor of tea.

EXAMPLE 6

1 Kg. of roasted coffee beans (Peru) containing 20 g. of water was placed in an extraction tower, 500 g. of water at 5° C were added and the tower was tightly sealed. Thereafter 2.5 Kg. of liquid dimethyl ether were added, and the resultant mixture in the tower was left standing for 20 minutes under a pressure of 5 atmospheres to effect extraction. After the extraction, the mixture was filtered. The dimethyl ether content of the resultant extracted solution was recovered by vaporization at −10° C, with the result that a frozen extract having the desired odor and flavor was obtained. The residue of extraction was extracted with 3 liters of hot water, and the resultant hot water-soluble extract was concentrated to 500 g. This extract was frozen and then combined with the above described frozen extract. The mixture was dried by freeze-drying to produce 280 g. of instant coffee powder. When 1.5 g. of this powder were added to 150 ml of hot water, the solution had an odor and flavor resembling those of coffees prepared in a percolator. It was free from the odor peculiar to the marketed instant coffee.

EXAMPLE 7

1 Kg. of roasted coffee beans (Brazil) containing 20 g. of water was ground to a particle size of 20 mesh, placed in an extraction tower and extracted for 15 minutes with 0.5 Kg. of cold water (5° C) and 3 Kg. of liquid dimethyl ether. The mixture was filtered. The dimethyl ether content of the extracted solution was recovered at −5° C to afford an extract with an intense odor and flavor. A hot water-soluble extract was obtained by treating the residue of extraction with 3 Kg. of hot water by the ordinary method and the extract was concentrated to 500 g. The concentrate was cooled and blended with the formerly prepared extract. The mixture was frozen. When 5 g. of the frozen mixture were dissolved in 100 ml of water and 30 g. of ice were added thereto, there was obtained an iced coffee which emitted the light odor of roasted coffee beans. The combined weight of the extracts was 750 g. including 210 g. of solids.

EXAMPLE 8

Roasted coffee beans (Brazil) were ground to a particle size of 20 to 80 mesh. To 10 g. each of the ground coffee containing 0.2 g. of water, (A) 40 g. of liquid dimethyl ether and (B) 30 g. of liquid dimethyl ether and 10 g. of water were added respectively. Each resultant sample was placed in a cylinder having a volume of 300 ml, shaken for 10 minutes at normal room temperature to effect extraction, and then filtered to produce an extracted solution. The two samples were left standing at −5° C to remove the dimethyl ether. Each residue from the aforementioned extraction was placed in 300 ml of hot water, extracted with hot water by the ordinary method to produce a coffee extracted solution and vacuum concentrated at 70° C to produce about 10 g. of paste. The formerly prepared aromatic extract was frozen to the form of paste, and then combined with the paste from the aqueous treatment. The combined paste was dried by freeze-drying to give about 2.2 g. of dry powder. Each sample was placed in 100 ml portions of hot water to prepare coffee and put to a sensory test by a panel of ten members. To the question as to which coffee gave a better flavor, the panel members gave answers in favor of sample (B) at the ratio of A:B = 1:9.

EXAMPLE 9

A 1 liter pressure proof container was charged with 30 g. of rose petals containing 25.5 g. of water and 50 cc of liquid dimethyl ether and hermetically sealed. The contents of the container were shake extracted (60 cycles/min.) at 5° C under 3 atmospheres for 15 minutes. The dimethyl ether containing the extract was transferred in a liquid form into a 10 liter pressure proof container to separate the solution from rose petals. This procedure was repeated ten times using newly supplied raw materials each time. The dimethyl ether solution thus obtained was left at 0° C under atmospheric pressure to vaporize the dimethyl ether. Consequently, there was obtained 45 g. of extract having a high water content. On standing, the extract separated into an oil phase and a water phase. When the oil phase was separated in a separation funnel containing 20 cc of 95% ethanol to produce an alcohol essence and then left to stand at a lowered temperature under a reduced pressure to effect removal of alcohol, there were obtained 700 mg. of rose essence oil.

EXAMPLE 10

A 1 liter pressure proof container was charged with 100 g. of jasmine petals containing about 8 g. of water and 700 cc of liquid dimethyl ether and hermetically sealed. Thereafter the contents of the container were subjected to shake extraction (60 cycles/min.) at 0° C under 2.5 atmospheres for 20 minutes. The extract was transferred in a liquid form into another 1 liter pressure proof container to separate the solution from jasmine petals. When this solution was left standing at 5° C under atmospheric pressure, there was obtained 10 g. of extract. When this extract was combined with 50 cc of 95% ethanol to effect alcohol extraction and then held at a lowered temperature under a reduced pressure to effect removal of alcohol, there was obtained 0.2 g. of jasmine essence oil.

EXAMPLE 11

A 300 cc vessel was charged with 30 g. of petals of Artemisia absenthium L. (containing about 26 g. of water) and 100 cc of liquid dimethyl ether. Extraction was carried out under normal pressure at $-30°$ C for 5 minutes. The dimethyl ether containing extract was separated from petals by decantation.

The solution thus obtained was left at room temperature under atmospheric pressure to remove dimethyl ether through vaporization. Consequently, there were obtained 192 mg. of crude essence oil of Artemisia absenthium L.

On standing, the extract separated into an oil phase and a water phase. The oil phase was separated utilizing a separation funnel and, after removing the solvent, 30 mg. of purified essence oil of Artemisia absenthium L. was obtained.

EXAMPLE 12

A 1 liter autoclave was charged with 100 g. of cubes of roast chicken (containing 53 g. of water) about 1 cm³ in volume, 400 g. of liquid dimethyl ethyl was added and the autoclave was hermetically sealed. The contents of the autoclave were shake extracted (100 cycles/min.) at 40° C under 7.3 atmospheres for 5 minutes. The extracted solution was separated from the solid phase and left at room temperature under atmospheric pressure to remove dimethyl ether through vaporization. Consequently, there were obtained 56 g. of an aqueous solution containing 6.0 g. oil having the odor of roasted chicken.

The solid phase was 44 g. of defatted roast chicken containing 22 g. of solid phase.

Roast beef and pork can be treated in the same manner to obtain flavor and odor containing mixtures.

EXAMPLE 13

A 1 liter pressure proof container was charged with 200 g. of homogenized egg yolk (containing 100 g. of water) and 600 g. of liquid dimethyl ether and hermetically sealed. The contents of the container were shaken (100 cycles/min.) at 10° C under 3 atmospheres for 10 minutes. The extracted solution was separated from the solid phase.

The solution was allowed to stand at room temperature under atmospheric pressure to remove dimethyl ether through vaporization. The residue which was suspended in water was separated by centrifugation (1000 R.P.M.). Consequently, there were obtained 65 g. of crude yolk oil.

The crude yolk oil was purified by centrifugation (3000 R.P.M.) for minutes to provide 35 g. of purified yolk oil.

The residue from the dimethyl ether extraction was composed of 45 g. of white protein powder having purity above 90%.

EXAMPLE 14

This example illustrates the importance of operating along line B or in area C of FIG. 2. The extraction liquids are identified by a letter corresponding to an area or line from the figure. The specific point at 20° C for each extraction liquid is along dotted line H of FIG. 2.

Roasted coffee beans (Brazil) which are 2% in water content were ground to a particle size of 20 to 80 mesh.
  A. One hundred (100) g. of the ground coffee was combined with 400 g. of liquid dimethyl ether.
  B. One hundred (100) g. of the ground coffee was combined with 22.5 g. of water and 377.5 g. of liquid dimethyl ether.
  C.
    1. One hundred (100) g. of the ground coffee was combined with 70 g. of water and 330 g. of liquid dimethyl ether.
    2. One hundred (100) g. of the ground coffee was combined with 230 g. of water and 170 g. of liquid dimethyl ether.
  D. One hundred (100) g. of the ground coffee was combined with 260 g. of water and 140 g. of liquid dimethyl ether.
  E. One hundred (100) g. of the ground coffee was combined with 300 g. of water and 100 g. of liquid dimethyl ether.

Each mixture was placed in a pressure proof 1000 ml cylinder, shaken at 20° C for 20 minutes to effect extraction, and thereafter filtered to obtain an extracted solution. Each solution was held at 5° C to evaporate the dimethyl ether. Each extract was placed in a one liter Erlenmeyer flask, sealed with aluminum foil, left to stand at rest for five minutes in a room, and then used as a sample in sensory test by a panel of 20 members. The samples were tried by the ranking method for quality of aroma. The following results were obtained:

TABLE 2

| Sample | Test for Quality of Aroma | | | | | | Total | Score* |
| --- | --- | --- | --- | --- | --- | --- | --- | --- |
| | Point | | | | | | | |
| | 1 | 2 | 3 | 4 | 5 | 6 | | |
| (A) | 0 | 0 | 0 | 3 | 15 | 2 | 99 | 1.2 |
| (B) | 5 | 4 | 5 | 5 | 1 | 0 | 53 | 2.3 |
| (C)-1 | 8 | 5 | 5 | 2 | 0 | 0 | 41 | 2.9 |
| (C)-2 | 6 | 6 | 7 | 1 | 0 | 0 | 43 | 2.8 |
| (D) | 1 | 5 | 3 | 9 | 2 | 0 | 66 | 1.8 |

TABLE 2-continued

| Sample | Test for Quality of Aroma Point | | | | | | Total | Score* |
|---|---|---|---|---|---|---|---|---|
| | 1 | 2 | 3 | 4 | 5 | 6 | | |
| (E) | 0 | 0 | 0 | 0 | 2 | 18 | 118 | 1.0 |

*Determined by the following formula:

Score of aroma quality = $\frac{1}{\text{Total Points}} \times 120$

According to the standard scale for determining aroma quality, the higher the score, the better the quality. The advantages of operating according to the defined method of this invention will be obvious from an inspection of the scores.

EXAMPLE 15

A 100 cc micro-cylinder was charged with 10 g. of powdered nutmeg containing 0.2 g. of water, 50 g. of liquefied dimethyl ether (−30° C) and 2 g. of water. It was then hermetically sealed. The mixture in the microcyclinder was subjected to shake extraction (60 cycles/min.) at 18° C under 3.5 atmospheres for 15 minutes.

The microcylinder was turned upside down to allow the dimethyl ether solution containing the extract to spurt out through a filter cloth.

This solution was heated with water at 10° C under atmospheric pressure to separate the extract from dimethyl ether through vaporization of dimethyl ether. Consequently, there were obtained 20 g. of extract.

This was left to stand at 10° C under reduced pressure (50 mm Hg) for 30 minutes, with the result that the residual dimethyl ether content of the extract was lowered to below 10 ppm.

The extraction procedure was repeated at −30° C.

With both extraction procedures an extraction mixture was obtained with a strong nutmeg odor and flavor.

What is claimed is:

1. A method for obtaining a mixture containing hydrophilic and lipophilic flavor and odor producing components of food substrates which comprises extracting said foods with a liquid dimethyl ether-water extract mixture, free of solid phase dimethyl ether or water, at a temperature of from about −25° C to 40° C, and thereafter separating the extraction residue and removing at least the dimethyl ether portion of the extraction mixture by evaporation; the weight ratio of dimethyl ether to substrate being from 1:1 to 5:1, the weight ratio of water to dimethyl ether in the extraction mixture being such that in the phase diagram of the system shown in FIG. 2 hereof, the amounts of each component are defined as a point in the area C or as a point located along the line B.

2. A method as in claim 1 wherein the water freezes during evaporation and is thereafter removed by freeze drying.

3. A method as in claim 1 wherein the extraction is carried out at from −25° C to 25° C at from 1 to 4 atmospheres of pressure.

4. A method as in claim 2 wherein the extraction is carried out at from −25° C to 25° C at from 1 to 4 atmospheres of pressure.

5. A method as in claim 1 wherein the evaporation is carried out in the presence of a carrier for the flavor and odor producing components.

6. A method as in claim 3 wherein the evaporation is carried out in the presence of a carrier for the flavor and odor producing components.

7. A method as in claim 5 wherein the carrier is selected from the group consisting of talc, kaolin, celite, white carbon, lactose, sucrose, starch, microcrystalline cellulose and powdered cereals.

8. A method as in claim 3 wherein the carrier is selected from the group consisting of talc, kaolin, celite, white carbon, lactose, sucrose, starch, microcrystalline cellulose and powdered cereals.

9. A method as in claim 1 wherein the substrate contains more than 50% by weight of water and the extraction mixture is formed in situ by the addition of dimethyl ether to the substrate.

10. A method as in claim 3 wherein the substrate contains more than 50% by weight of water and the extraction mixture is formed in situ by the addition of dimethyl ether to the substrate.

11. A method as in claim 1 wherein the substrate is a food selected from the group consisting of pepper, nutmeg, turmeric, laurel, anise, thyme, coffee, tea, dried bonito, dried shiitake, lemon, lime, citron, roast chicken, roast beef, roast pork and egg yolk.

12. A method as in claim 3 wherein the substrate is a food selected from the group consisting of pepper, nutmeg, turmeric, laurel, anise, thyme, coffee, tea, dried bonito, dried shiitake, lemon, lime, citron, roast chicken, roast beef, roast pork and egg yolk.

13. A method as in claim 1 wherein the substrate is selected from the group consisting of coffee, tea, bonito and shitake, said method including the additional steps of
   a. extracting the extraction residue with water,
   b. evaporating the water to produce a water extract residue, and
   c. adding at least a portion of the flavor and odor producing mixture to the water extract residue.

14. A method as in claim 3 wherein the substrate is selected from the group consisting of coffee, tea, bonito and shitake, said method including the additional steps of
   a. extracting the extraction residue with water,
   b. evaporating the water to produce a water extract residue, and
   c. adding at least a portion of the flavor and odor producing mixture to the water extract residue.

* * * * *